(12) United States Patent
Llorente Gonzelez et al.

(10) Patent No.: US 7,821,157 B2
(45) Date of Patent: Oct. 26, 2010

(54) METHOD AND DEVICE FOR INJECTING REACTIVE CURRENT DURING A MAINS SUPPLY VOLTAGE DIP

(75) Inventors: Jose Ignacio Llorente Gonzelez, Navarra (ES); Manuel Visiers Guixot, Pamplona (ES)

(73) Assignee: Gamesa Innovation and Technology S.L., Pamplona (Navarra) (ES)

( * ) Notice: Subject to any disclaimer, the term of this patent is extended or adjusted under 35 U.S.C. 154(b) by 334 days.

(21) Appl. No.: 11/884,826

(22) PCT Filed: Feb. 22, 2006

(86) PCT No.: PCT/ES2006/000079

§ 371 (c)(1),
(2), (4) Date: Aug. 21, 2007

(87) PCT Pub. No.: WO2006/089989

PCT Pub. Date: Aug. 31, 2006

(65) Prior Publication Data

US 2008/0252143 A1 Oct. 16, 2008

(30) Foreign Application Priority Data

Feb. 23, 2005 (ES) ............... 200500411

(51) Int. Cl.
*H02J 3/38* (2006.01)
(52) U.S. Cl. .......... 307/47; 307/44; 307/45; 307/46; 307/48

(58) Field of Classification Search ........ 307/44, 307/45, 46, 47, 48
See application file for complete search history.

(56) References Cited

U.S. PATENT DOCUMENTS

| 5,376,828 | A * | 12/1994 | Kim et al. | 307/64 |
| 6,215,202 | B1 * | 4/2001 | Luongo et al. | 307/64 |
| 6,747,370 | B2 * | 6/2004 | Abe | 307/66 |
| 6,924,565 | B2 * | 8/2005 | Wilkins et al. | 290/44 |
| 6,987,331 | B2 * | 1/2006 | Koeppe et al. | 307/66 |
| 7,002,260 | B2 * | 2/2006 | Stahlkopf | 290/44 |
| 7,099,169 | B2 * | 8/2006 | West et al. | 363/132 |
| 7,298,059 | B2 * | 11/2007 | Delmerico et al. | 307/85 |
| 2005/0012395 | A1 * | 1/2005 | Eckroad et al. | 307/44 |

\* cited by examiner

*Primary Examiner*—Jared J Fureman
*Assistant Examiner*—Hal I Kaplan
(74) *Attorney, Agent, or Firm*—Ladas & Parry LLP

(57) ABSTRACT

The invention relates to a method and device for injecting current during a mains supply voltage dip. The inventive method consists in permanently monitoring the magnitude and phase of the mains supply voltage and, upon detection of a voltage dip, injecting reactive current in the affected main supply phase(s) in a manner that can vary over the duration of the voltage dip, at very short intervals, proportionally to the magnitude of the dip, thereby absorbing the necessary active current. The device comprises a voltage measurement switch, a transformer (low voltage/medium voltage), a DC/AC inverter, a capacitor, a voltage dip detection circuit, and a control circuit.

11 Claims, 2 Drawing Sheets

METHOD AND DEVICE FOR INJECTING REACTIVE CURRENT DURING A MAINS SUPPLY VOLTAGE DIP

FIELD OF THE INVENTION

This invention refers to a procedure and a device for injecting reactive current onto a network to which one or various electrical power generation machines are connected when a network voltage dip occurs, particularly for application at wind farms.

BACKGROUND OF THE INVENTION

On the electricity network connection at the output of a farm of electricity generating machines such as wind turbines, a "voltage dip" may occur, which consists of a brusque decrease in voltage as a result of faults on the network, which causes a dip zone or constant decrease in voltage and a swell zone with increasing voltage once the fault which caused the dip is resolved, both of which have a determined duration depending on the voltage dip that occurred. Due to the technical requirements of the network, during the voltage dip a time variable injection of the reactive current required by the machines is needed, in order to contribute toward re-establishing the voltage and reducing the affects of said dip.

In this sense, the regulatory bodies for electrical networks define curves which determine the value of the reactive current that should be injected onto the network during the voltage dip. These curves give a reactive current value according to the depth of the detected dip.

In this technique there are known devices with which reactive current is permanently injected at a variable setting which can be changed in time frames of minutes or seconds.

With such devices however, the reactive current to be injected cannot be adapted to the variable network voltage in very short periods of time. In addition, the known devices are designed with overload capacities limited to two or three times their nominal capacities, which makes their application with high current economically impractical.

This invention is focused on providing a solution to this problem.

SUMMARY OF THE INVENTION

The first aspect of this invention proposes a procedure for injecting reactive current onto a network to which one or various electrical power generation machines are connected when a voltage dip occurs, which comprises the following steps:
  Permanent monitoring of the magnitude and phase of the network voltage.
  On detecting a mono-phase, two-phase or three-phase voltage dip, injecting reactive current on the phase or phases of the network in a variable manner for the time duration of the voltage dip in proportion to its magnitude, absorbing the active power necessary.
  The procedure allows the injection of the current required by the regulatory bodies on detecting the variation of the network voltage within very small time intervals and is able to vary the magnitude of the reactive current injected, also within very small time frames.

Secondly, this invention proposes a device for carrying out the aforementioned procedure for a medium voltage network which integrates, as principal components, the following:
  A medium voltage switch.
  A low voltage/medium voltage transformer (LV/MV).
  A dc/ac inverter.
  A capacitor for energy storage and device stability.
  A circuit for detecting voltage dips on the MV network;
  A control circuit for the group of above mentioned elements, which comprises a circuit for detecting the voltage dip on the MV network that, once it detects that the network voltage value is below the setting threshold, starts up the invention device in order for it to inject the instantaneous reactive current required to balance the network voltage according to the technical requirements indicated by the aforementioned curve and for the transitory duration of the voltage dip that has occurred.

Other characteristics and advantages of this invention become apparent in the detailed description and the accompanying figures that follow.

DETAILED DESCRIPTION OF THE INVENTION

Figure 1:
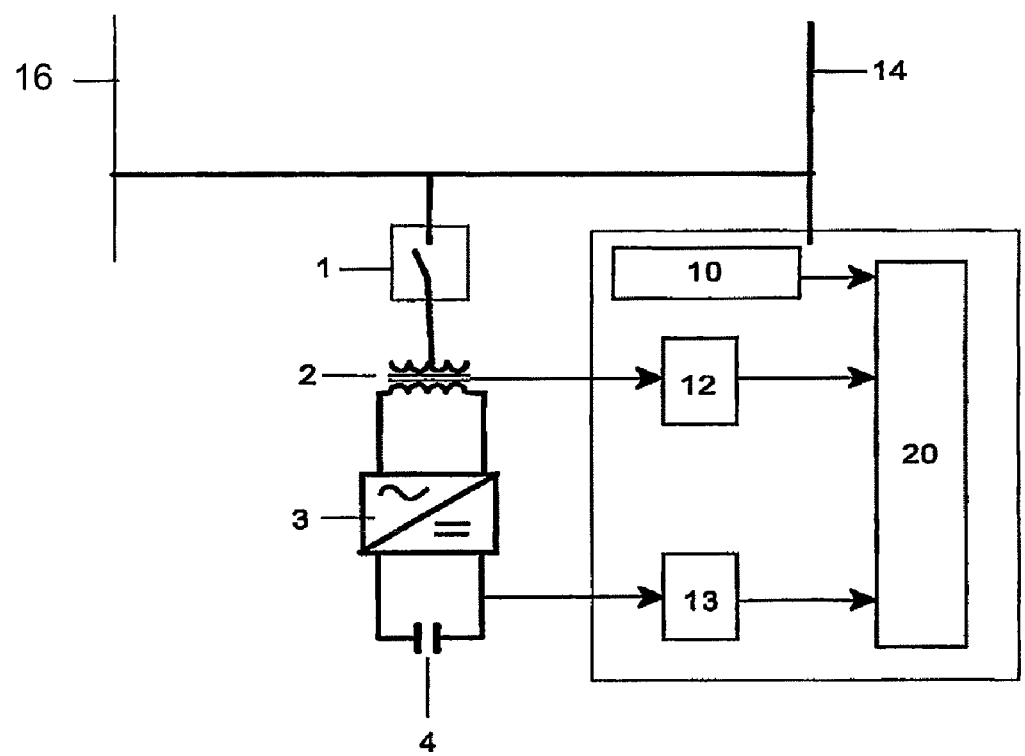
FIG. 1 shows a block diagram with the components that make up a device according to this invention.

The device according to the invention for a wind farm is comprised of, in a preferred embodiment, the following elements:
  a) A medium voltage switch 1 for the connection of the device to the medium voltage circuit, from the output 16 of the farm to the network connection 14;
  b) A LV/MV transformer 2 connected on its LV side to a dc/ac inverter 3 and, on its MV side to the switch 1 for each phase;
  c) A dc/ac inverter 3, preferably with Insulated Gate Bipolar Transistor (IGBT) or Insulated Gate Commutated Thyristor (IGCT), for each phase, connected on its dc side to a capacitor 4, and on its ac side to the low voltage (LV) primary of the transformer 2;
  d) A dc capacitor 4 connected to the power circuit of the inverter 3 on its dc side;
  e) A control circuit 20 for the group of aforementioned units, connected to some controls 10, 12, 13 associated with them and which comprises the following elements:
    a MV voltage sensor, or voltage transformer;
    a LV power sensor, hall effect transformer or similar;
    a dc voltage sensor, voltage transformer or hall effect transformer or similar;
    a voltage dip detection circuit 10 with a digital signal processor (DSP), which detects the voltage value below the setting threshold of the device according to this invention;
    a device for calculating the instantaneous reactive current to be injected, like a DSP or a microprocessor;
    a device for calculating the instantaneous active power to be absorbed;
    a hysteresis bands generator for the instantaneous reactive current to be injected;
    a comparison circuit for comparing the real current circuit readings with those pre-set by the hysteresis bands;
    a pulse generator circuit to switch on or off some self-switch power semiconductors;
    an optical fiber connection circuit between the above described circuit and some trigger circuits of the self-switch power semiconductors;

a control and manoeuvre circuit for the different power stages.

Instead of the aforementioned mono-phase components, the device may be comprised of three-phase components when an injection per phase is not required, with its operation similar to that described below.

When a voltage dip occurs on the MV network 14, it is characterised by a zone of a brusque decrease in voltage, a dip zone of constant depth and a swell zone of increasing voltage once the fault causing the dip has been cleared.

Figure 2:
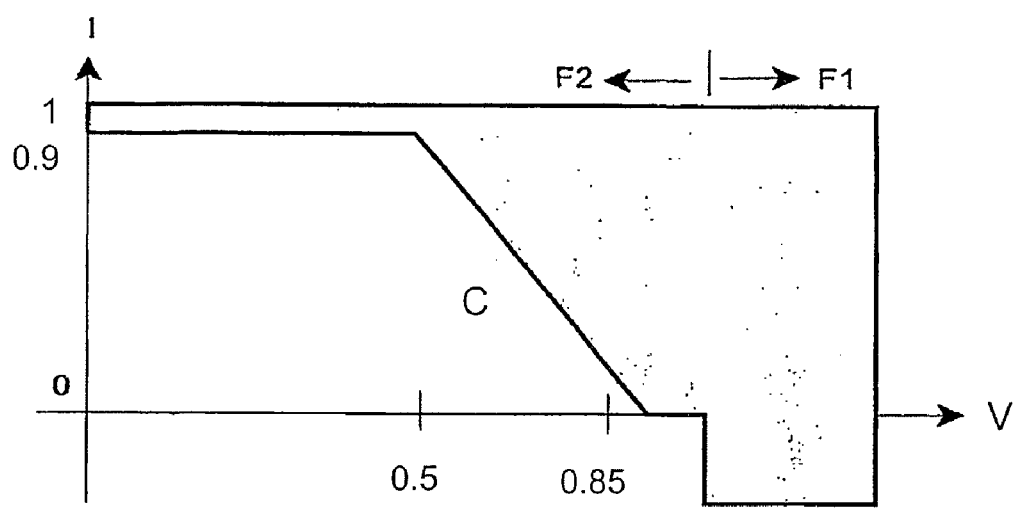
FIG. 2 shows a graph of the reactive current that must be injected onto the network during the transitory duration of the voltage dip.

To remedy the effects of said dip on the network, the regulatory bodies of the electrical networks define a curve (FIG. 2) on which the abscissa axis represents the voltage V at the point of connection to the network (in terms of its relation with the nominal voltage) and the ordinate axis represents the reactive current I (in terms of its relation with the total current). The arrow F1 indicates a normal operating situation and the arrow F2 indicates a voltage dip situation in which the curve C defines the magnitude of the reactive current that must be injected.

The voltage dip detection circuit 10, preferably with a digital signal processor (DSP), using the appropriate algorithms and based on the values of the instantaneous voltage readings of the MV network 14, continuously calculates the peak and rms values of voltages, as well as their phase, forcing the start-up process of the device according to this invention when a voltage value below the threshold to which said device has been set is detected. This circuit 10 is capable of detecting a dip in 1 millisecond, and can calculate the reactive component in amplitude and phase according to the relationship defined by the C curve in 2 milliseconds, injecting reactive current from an instant two milliseconds later than the appearance of the dip on the network 14.

Once the dip is detected, the control circuit 20 calculates the reactive current to be injected based on the values of the instantaneous voltage measured on the network 14 by the circuit 10 according to the relationship defined by curve C, as well as the instantaneous active current that needs to be absorbed from the MV network 14, through the transformer 2 and the inverter 3, thus maintaining the voltage of the capacitor 4 connected on the dc side of the inverter 3. In addition, the control circuit 20 comprises a manoeuvre and control (13) circuit for the different sections of the power stages, in order to control the switching on and off of each of them according to the reactive current value that needs to be injected at each instant in a sequential way.

Other important characteristics of the device according to this invention, are as follows:

The instantaneous power handled during the duration of the voltage dip by the device of this invention is between 20 to 30 MW, 30 times more than the admissible power by the standard devices with self-switch elements.

The device needs no power source or ac/dc rectifier to function because it takes its power from the ac network 14 and transfers it in a controlled (12) manner to the capacitor connected on the dc side.

The device is capable of extracting the necessary active power from the network 14 in order to carry out its function even when the network voltage falls to 20% of its nominal value, in other words when the depth of the voltage dip reaches 80%.

The device is able to inject variable reactive current on each phase, and therefore acts correctly in the event of monophase or two-phase faults.

The device is modular on each phase, therefore, in the event of a fault on one module, the remaining modules continue to operate.

The device has a sequential control, therefore at each moment just the convenient modules, according to the current that must be injected to the network at each moment to improve the performance with low power and reduce the injected harmonic distortion, will work.

In the embodiment we have just described, modifications can be made within the range defined in the following claims:

The invention claimed is:

1. A device for injecting reactive current onto an MV network (14) to which one or various electrical power generation machines are connected when a voltage dip occurs on said network (14) due to a mono-phase, two-phase, or three-phase fault, comprising:
    a) a medium voltage switch (1) on the connection of an output from a wind farm 16 to the network (14);
    b) an LV/MV transformer (2) on each phase;
    c) a dc/ac inverter (3) on each phase with IGBT or IGCT semiconductors;
    d) a dc capacitor (4) on each phase; and
    e) a control circuit (20) on each phase, connected to the controls (10, 12, 13) associated with each of the aforementioned units and which includes voltage and current sensors, a voltage dip detection circuit (10) with DSP, devices for calculating the instantaneous voltage on the network (14), and voltage comparison circuits, so that when the circuit (10) detects a voltage dip, reactive current from the output of the wind farm (16) is injected onto the MV network (14) in a variable manner at each time interval or cycle, based on the measurements provided by the sensors and circuits, taking the necessary active current from the network (14) to the capacitor (4).

2. A device for injecting reactive current into a MV network (14) to which one or various electrical power generation machines are connected when a voltage dip occurs on said network (14) due to a three-phase fault, comprising:
    a) a medium voltage switch (1) on the connection of an output from a wind farm 16 to the network (14);
    b) an LV/MV three-phase transformer (2);
    c) a dc/ac three-phase inverter (3) with IGBT or IGCT semiconductors;
    d) a dc capacitor (4); and
    e) a control circuit (20) for the aforementioned units, connected to the controls (10, 12, 13) associated with each of the units and which includes voltage and current sensors, a voltage dip detection circuit (10) with DSP, devices for calculating the instantaneous voltage on the network (14), and voltage comparison circuits, so that when the circuit (10) detects a voltage dip, reactive current from the output of the wind farm (16) is injected onto the MV network (14) in a variable manner at each time interval or cycle, based on the measurements provided by the sensors and circuits, taking the necessary active current from the network (14) to the capacitor (4).

3. The device for injecting reactive current onto an MV network (14) to which one or various electrical power generation machines are connected when a voltage dip occurs on said network (14) due to a mono-phase, two-phase, or three-phase fault, according to claim 1, wherein the voltage dip detection circuit (10) detects a voltage dip due to mono-phase, two-phase, or three-phase faults in a time frame equal to or less than 1 millisecond.

4. The device for injecting reactive current onto an MV network (14) to which one or various electrical power generation machines are connected when a voltage dip occurs on said network (14) due to a mono-phase, two-phase, or three-phase fault, according to claim 1, wherein the control circuit

(20) varies the magnitude of the reactive current injected in time intervals of less than or equal to 20 milliseconds.

5. The device for injecting reactive current onto an MV network (14) to which one or various electrical power generation machines are connected when a voltage dip occurs on said network (14) due to a mono-phase, two-phase, or three-phase fault, according to claim 1, wherein the device takes its power from the MV network (14).

6. The device for injecting reactive current onto an MV network (14) to which one or various electrical power generation machines are connected when a voltage dip occurs on said network (14) due to a mono-phase, two-phase, or three-phase fault, in accordance with claim 1, wherein said device is built in modules so that in the event of one of the modules failing, the remaining modules can continue to operate.

7. The device for injecting reactive current onto an MV network (14) to which one or various electrical power generation machines are connected when a voltage dip occurs on said network (14) due to a mono-phase, two-phase, or three-phase fault, according to claim 1, wherein said machines are wind turbines.

8. A procedure for injecting reactive current with a device according to claim 1 onto a network to which one or various electrical power generation machines are connected when a voltage dip occurs on said network due to a mono-phase, two-phase, or three-phase fault, comprising:
   a) permanent monitoring of the magnitude and phase of the network voltage; and
   b) on detecting a mono-phase, two-phase, or three-phase voltage dip, injecting reactive current from the output of the wind farm (16) on the affected phase or phases of the network in proportion to the magnitude of the voltage dip, in a variable manner for the duration of the voltage dip, absorbing from the network (14) the active current necessary.

9. The procedure for injecting reactive current with a device according to claim 8 onto an MV network to which one or various electrical power generation machines are connected when a voltage dip occurs on said network due to a mono-phase, two-phase, or three-phase fault, wherein said monitoring performed by the detection circuit (10) allows a voltage dip to be detected in a time of less than or equal to 1 millisecond.

10. The procedure for injecting reactive current with a device according to claim 8 onto an MV network to which one or various electrical power generation machines are connected when a voltage dip occurs on said network due to a mono-phase, two-phase, or three-phase fault, wherein the variation of the injected reactive current performed by the control circuit (20) takes place in time intervals of a less than or equal to 20 milliseconds.

11. The procedure for injecting reactive current with a device according to claim 8 onto a network to which one or various electrical power generation machines are connected when a voltage dip occurs on said network due to a mono-phase, two-phase, or three-phase fault, wherein said machines are wind turbines.

* * * * *